US009632629B2

(12) United States Patent
Prendergast et al.

(10) Patent No.: US 9,632,629 B2
(45) Date of Patent: Apr. 25, 2017

(54) SENSOR PATTERNS WITH REDUCED NOISE COUPLING

(75) Inventors: Patrick Norman Prendergast, Clinton, WA (US); Mark W. Rouse, Snohomish, WA (US)

(73) Assignee: PARADE TECHNOLOGIES, LTD., Santa Clara, CA (US)

(*) Notice: Subject to any disclaimer, the term of this patent is extended or adjusted under 35 U.S.C. 154(b) by 1166 days.

(21) Appl. No.: 13/248,705

(22) Filed: Sep. 29, 2011

(65) Prior Publication Data

US 2013/0082719 A1 Apr. 4, 2013

(51) Int. Cl.
G01R 27/26 (2006.01)
G06F 3/044 (2006.01)
G06F 3/041 (2006.01)

(52) U.S. Cl.
CPC ............ *G06F 3/044* (2013.01); *G06F 3/0418* (2013.01)

(58) Field of Classification Search
CPC ........................................... G06F 3/044
USPC ................. 324/658–686; 345/173–174
See application file for complete search history.

(56) References Cited

U.S. PATENT DOCUMENTS

| 6,297,811 | B1 | 10/2001 | Kent et al. | |
|---|---|---|---|---|
| 6,449,203 | B1 | 9/2002 | Cowles et al. | |
| 6,490,920 | B1* | 12/2002 | Netzer | G01C 9/06 324/687 |
| 7,656,390 | B2 | 2/2010 | Oda | |
| 7,808,487 | B2 | 10/2010 | Taylor et al. | |
| 2002/0152048 | A1* | 10/2002 | Hayes | 702/127 |
| 2006/0071671 | A1* | 4/2006 | Tola et al. | 324/662 |
| 2006/0274055 | A1* | 12/2006 | Reynolds et al. | 345/174 |
| 2008/0150905 | A1* | 6/2008 | Grivna et al. | 345/173 |
| 2009/0066669 | A1* | 3/2009 | Olson | 345/174 |
| 2009/0267916 | A1 | 10/2009 | Hotelling | |
| 2009/0273573 | A1* | 11/2009 | Hotelling | 345/173 |
| 2010/0045632 | A1 | 2/2010 | Yilmaz et al. | |
| 2010/0079393 | A1 | 4/2010 | Dews | |
| 2010/0164901 | A1 | 7/2010 | Chen et al. | |
| 2010/0302201 | A1 | 12/2010 | Ritter et al. | |
| 2010/0327881 | A1 | 12/2010 | Chang et al. | |
| 2011/0018557 | A1* | 1/2011 | Badaye | G06F 3/044 324/658 |
| 2011/0096025 | A1 | 4/2011 | Slobodin et al. | |

(Continued)

OTHER PUBLICATIONS

Chatterjee, R., "Capacitive Touch Sensor based User-Interface : Generic Design Considerations and Development of an Wearable Input Device," SICE Annual Conference, 2008; 5 pages.

(Continued)

*Primary Examiner* — Melissa Koval
*Assistant Examiner* — Demetrius Pretlow
(74) *Attorney, Agent, or Firm* — Morgan, Lewis & Bockius LLP

(57) ABSTRACT

A capacitive sense array configured to improve noise immunity in detecting a presence of a conductive object is described. In one embodiment, a capacitive sense array includes at least a first set of sense elements disposed in straight parallel lines along a first axis of the capacitive sense array. A second set of sense elements is disposed in crooked paths about a second axis of the capacitive sense array. The first and second sets form a capacitive sense array that includes crooked sense paths in at least one of the axes of the sense array.

17 Claims, 17 Drawing Sheets

(56) References Cited

U.S. PATENT DOCUMENTS

2011/0102361 A1  5/2011 Philipp
2012/0127116 A1* 5/2012 Edwards ................. G06F 3/044
                                                    345/174

OTHER PUBLICATIONS

Hwang, T-H. (May 2010). "A Highly Area-Efficient Controller for Capacitive Touch Screen Panel Systems," IEEE 56(2): 1115-1122. (Abstract only).
International Search Report for International Application No. PCT/US11/67128 dated Apr. 24, 2012; 2 pages.
Written Opinion of the International Searching Authority for International Application No. PCT/US 67128 dated Apr. 24, 2012; 5 pages.

* cited by examiner

| Measured Difference Counts | | | | | | | | |
|---|---|---|---|---|---|---|---|---|
| | Rx0 | Rx1 | Rx2 | Rx3 | Rx4 | Rx5 | Rx6 | Rx7 |
| Tx0 | 0 | 0 | 36 | 143 | 58 | 11 | 0 | 0 |
| Tx1 | 81 | 205 | 0 | 0 | 0 | 0 | 180 | 17 |
| Tx2 | 0 | 0 | 7 | 47 | 28 | 0 | 0 | 0 |
| Tx3 | 0 | 0 | 0 | 0 | 0 | 0 | 0 | 0 |

| Remapped Difference Counts | | | | | | | | |
|---|---|---|---|---|---|---|---|---|
| | Column0 | Column1 | Column2 | Column3 | Column4 | Column5 | Column6 | Column7 |
| Tx0 | 0 | 0 | 36 | 143 | 58 | 11 | 0 | 0 |
| Tx1 | 0 | 0 | 81 | 205 | 180 | 17 | 0 | 0 |
| Tx2 | 0 | 0 | 7 | 47 | 28 | 0 | 0 | 0 |
| Tx3 | 0 | 0 | 0 | 0 | 0 | 0 | 0 | 0 |

SENSOR PATTERNS WITH REDUCED NOISE COUPLING

TECHNICAL FIELD

This disclosure relates to the field of user interface devices and, in particular, to capacitive sense devices.

BACKGROUND

Capacitive sense arrays may be used to replace mechanical buttons, knobs and other similar mechanical user interface controls. The use of capacitive sense elements permits elimination of complicated mechanical switches and buttons to provide reliable operation under harsh conditions. In addition, capacitive sense elements are widely used in modern customer applications, providing new user interface options in existing products. Capacitive sense elements can be arranged in the form of a capacitive sense array for a touch-sensing surface. When a conductive object, such as a finger, comes in contact or close proximity with the touch-sensing surface, the capacitance of one or more capacitive touch sense elements changes. The capacitance changes of the capacitive touch sense elements can be measured by an electrical circuit. The electrical circuit converts the measured capacitances of the capacitive sense elements into digital values.

Transparent touch screens that utilize capacitive sense arrays are ubiquitous in today's industrial and consumer markets. They can be found on cellular phones, GPS devices, cameras, computer screens, MP3 players, digital tablets, and the like. In contemporary cellular phones and smart phones, touch screen area is of significant concern to manufacturers given the small amount of space available for user interaction. As such, manufacturers seek a touch screen made of layers of transparent materials that are as thin as possible. However, conventional thin layer designs exhibit considerable sensitivity to noise.

FIG. 1 illustrates a conventional pattern design of a capacitance sense array panel 100. The capacitance sense array panel 100 comprising an N×M sense element matrix which includes transmit ("Tx") electrodes 102 and receive ("Rx") electrodes 104. The transmit and receive electrodes 102, 104 in the N×M sense element matrix are arranged so that each of the transmit electrodes intersects each of the receive electrodes. Thus, each transmit electrode 102 is capacitively coupled with each of the receive electrode 104. For example, transmit electrode 102 is capacitively coupled with receive electrode 104 at the point where transmit electrode 102 and receive electrode 104 intersect. The intersection of the transmit electrode 102 and the receive electrode 104 is called a sense element. Although the intersection of the transmit electrodes 102 and the receive electrodes 104 are called sense elements, the electrodes themselves are referred to herein as sense elements since the electrodes can be disposed in a sense array that is used for mutual capacitance sensing, as well as in a sense array that is used for self capacitance sensing. It is noted that the embodiment disclosed in FIG. 1, the orientation of the axes of Tx electrodes may be switched with the Rx electrodes as would be appreciated by one of ordinary skill in the art having the benefit of this disclosure. It is also noted that the Tx electrodes 102 form straight parallel lines 106 along an axis 110 that is perpendicular to an axis 112 of the Rx electrodes 104 that also form straight lines 108.

Because of the capacitive coupling between the transmit and receive electrodes, a Tx signal (not shown) applied to each transmit electrode induces a current at each of the receive electrodes. For instance, when a Tx signal is applied to transmit electrode 102, the Tx signal induces an Rx signal (not shown) on the receive electrode 104. When a conductive object, such as a finger, approaches the N×M matrix, the object will modulate the signal by changing the mutual capacitance at the intersections of the Tx and Rx electrodes. Since a finger would normally activate about three to five neighboring intersections, a signal profile can be readily obtained. Finger location can therefore be determined by the distribution of this profile using a centroid algorithm.

FIG. 2 illustrates a conventional routing of liquid crystal display (LCD) lines 210 relative to the arrangement of electrodes and their axes of orientation. The (LCD) lines 210 generally run straight, parallel, and below parallel sets of Rx sense elements 220 connected to each other and to the same electrode (i.e., the column 230 or the RX electrode 230). LCDs may be configured to energize a column 230 of sense elements 220 at a 60-120 Hz rate. In such circumstances, a voltage that energizes the column 230 capacitively couples charge into sense elements 220. While a sensing circuit is making a measurement, the LCD control signal on the LCD column 210 couples the charge onto column 230 as noise. The more coupling that exists between the straight LCD lines 210 and the straight parallel column 230 of the Rx sense elements 220, the higher the noise amplitude induced into the Rx sense elements 220 due to the LCD column 210.

BRIEF DESCRIPTION OF THE DRAWINGS

The present invention is illustrated by way of example, and not of limitation, in the figures of the accompanying drawings in which:

FIG. 12C shows a table of the difference counts measured by the controller of FIG. 5 and the remapped values corresponding to the physical location of a touch as depicted in FIG. 12B.

DETAILED DESCRIPTION

Figure 1:
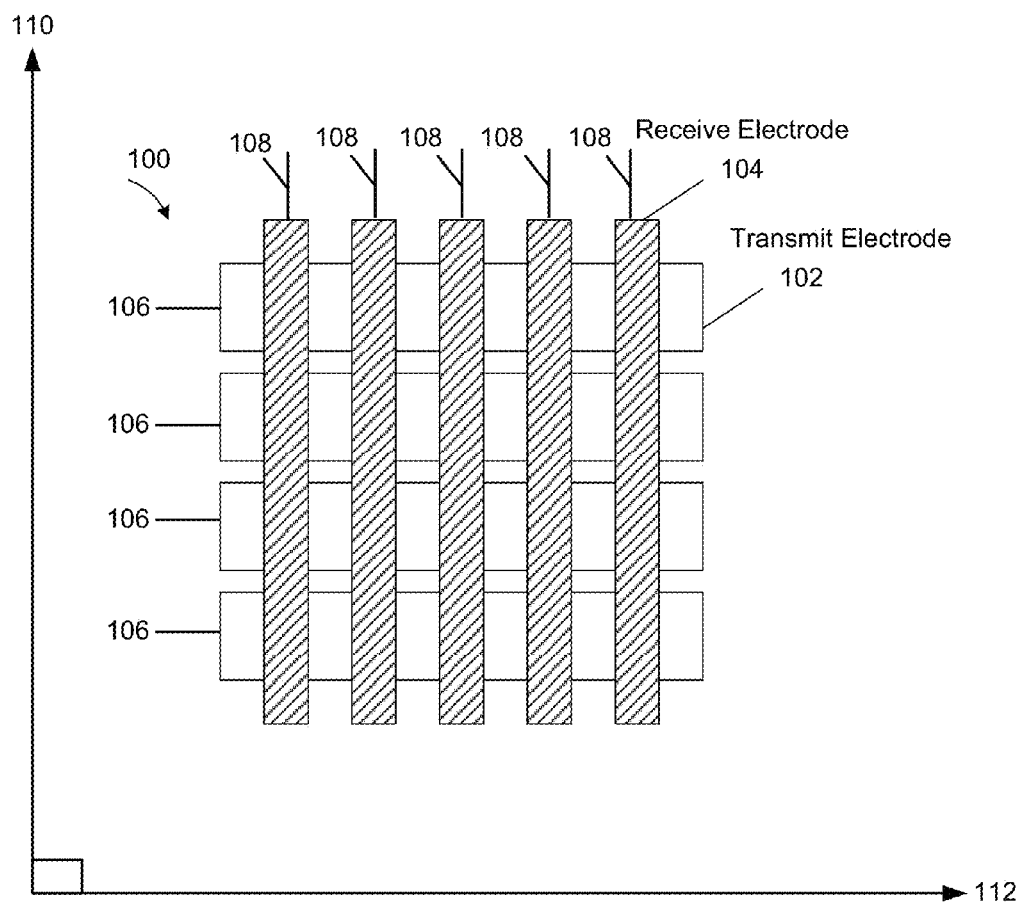
FIG. 1 illustrates a conventional pattern design of a capacitive sense array panel.
Figure 2:
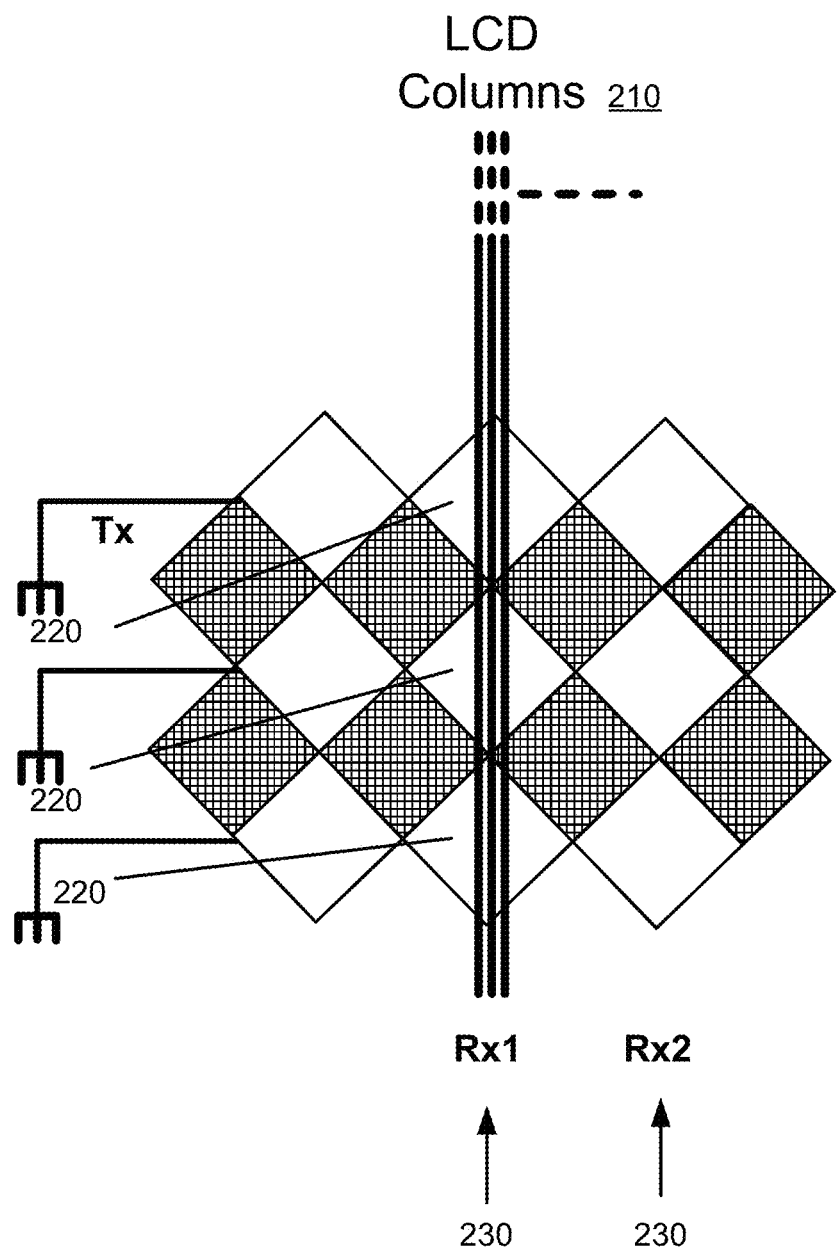
FIG. 2 illustrates a conventional routing of liquid crystal display (LCD) lines relative to the arrangement of electrodes and their axes of orientation.

A capacitive sense array configured to improve noise immunity in detecting a presence of a conductive object is described. In one embodiment, a capacitive sense array includes at least a first set of sense elements disposed in straight parallel lines along a first axis of the capacitive sense array. A second set of sense elements is disposed in crooked paths about a second axis of the capacitive sense array. Examples of crooked paths may include paths that are not straight or linear, but may be curved or angled relative to a straight set of lines or axes. The first and second sets form a capacitive sense array that includes crooked sense paths in at least one of the axes of the sense array. In one embodiment, two consecutive sense elements of the second set of sense elements are associated with different electrodes of the capacitive sense array. This may reduce the number of the intersections of any of the first set of sense elements and the second set of sense elements to about one electrode per finger touch area. This may also reduce noise coupling onto the set of crooked sense elements, such as noise from LCD/AMOLED control lines or noise from a charger, via a finger or other conductive object. As a result, a projected capacitive touch panel that supports thin cover glass may be constructed with less susceptibility to noise.

The capacitive sense array having crooked sense lines of sense elements may be coupled to a processing device configured to detect a conductive object proximate to the capacitive sense array. The processing device may also be configured to use the first set of sense elements as one of transmit (Tx) electrodes and receive (Rx) electrodes and the second set of sense elements as the other one of the Tx electrodes and the Rx electrodes. The Tx electrodes and the Rx electrodes can be used for mutual capacitance sensing. In another embodiment, the sense elements may be used in a capacitive sense array that is used for self capacitance sensing.

In another embodiment, instead of, or in addition to creating sense elements arranged along crooked sense lines, the sense lines themselves may be arranged off-axis relative to a rectangular grid of (x,y) coordinates. Various embodiments include disposing Rx sense elements in straight lines along a first axis at an oblique angle relative to Tx electrodes disposed in straight parallel lines along a second axis. The crooked paths may be disposed to not be parallel to LCD control lines that are disposed in straight parallel lines about the second axis. The Rx sense lines may form patterns that are wavy, zig-zag, semicircular or oval wavy, circular concentric, radial, etc. The Rx sense element may have a shape of a single-solid diamond (SSD), a dual-solid diamond (DSD), a set of horizontal and vertical bars, a totem pole, and a double arrow, circles, pentagons, interdigitated combs, spirals, etc.

A touch sense controller associated with the above-described embodiments may be configured to translate the resulting crooked and/or off-axis coordinate to a regular rectangular grid for re-use of existing touch sense map creation algorithms (e.g., centroid algorithms).

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 3:
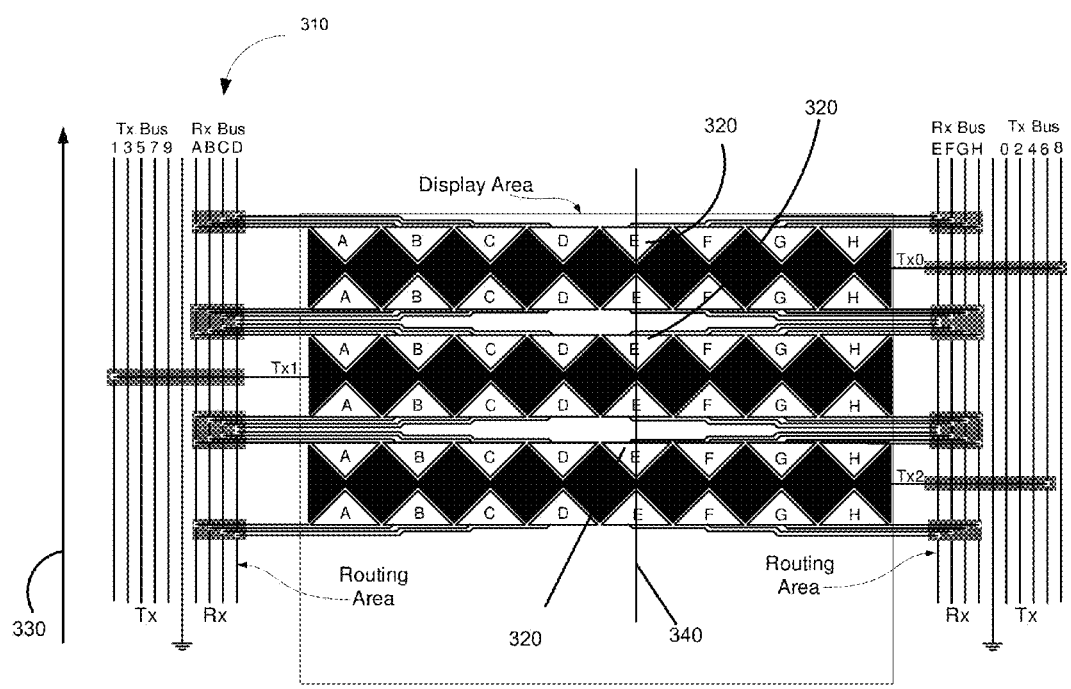
FIG. 3 illustrates a conventional single-layer routing of conductive traces relative to an arrangement of Rx electrodes and their axis of orientation.

FIG. 3 illustrates a routing of conductive traces 310 relative to the arrangement of Rx sense elements 320 formed into electrodes 340 and their axis of orientation 330. Sets of Rx sense elements 320 connected to the same conductive trace 310 are routed in a way that is likely to run parallel to noise-generating LCD control lines 310 (e.g., in FIG. 3, the $4^{th}$ column 320 of half-diamond shapes are electrically connected as a single electrode 340). This may lead to high noise coupling into the Rx electrodes 340. A change in voltage on the electrode 340 in the display can cause the current received by the Rx electrodes 340 to be changed. The closer the conductive traces 310 are to the straight lines of corresponding sets of Rx electrodes 340 and the longer the distance that they run in parallel, the greater the noise coupling. This coupled noise may impact the ability to properly sense finger location.

Figure 4:
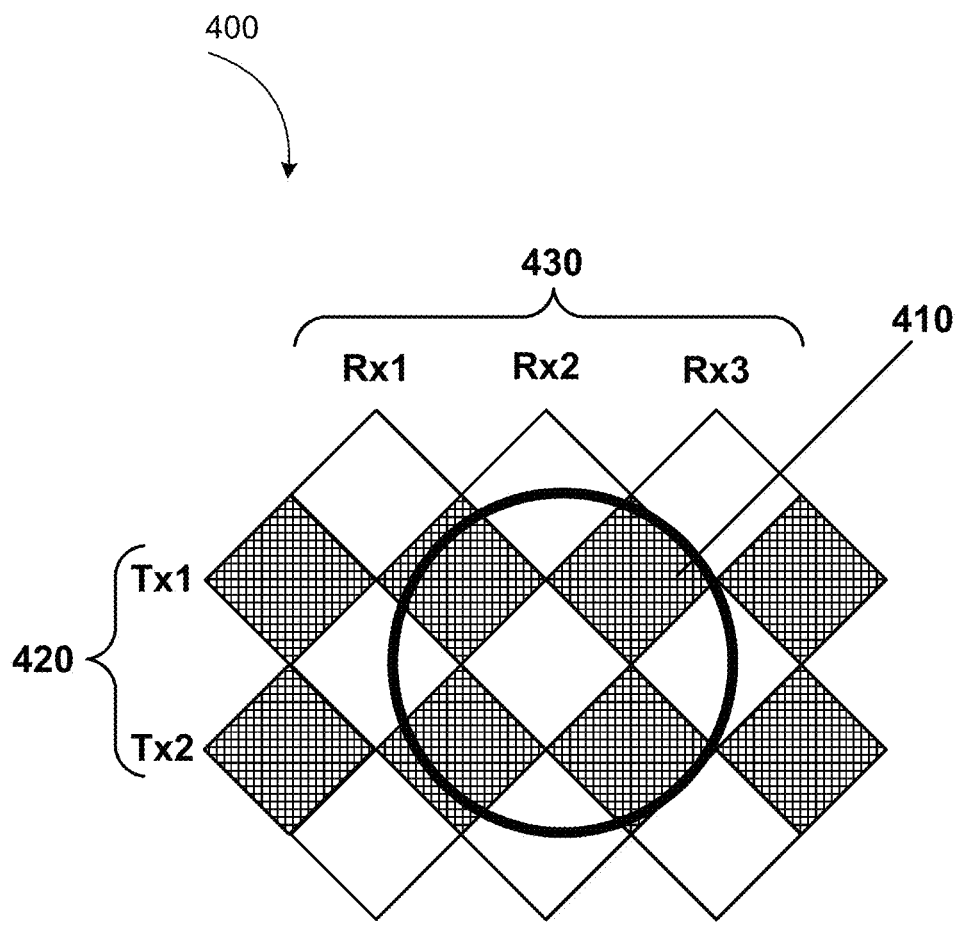
FIG. 4 shows an approximate finger area that may overlay a group of Rx electrodes associated with a set of Rx electrodes when a user touches a touch sense array.

FIG. 4 shows an approximate finger area that may overlay a group of Tx electrodes 420 associated with a set of Rx electrodes 430 when a user touches a touch sense array. For example, when a user of an electronic device having a capacitance sense array panel 400 connects a charger to the electronic device, noise in the charger may couple into the Rx electrodes 430 through the finger. The amount of coupling from the charger is proportional to the amount of finger area (410 in FIG. 4) that overlaps Rx electrode area. The finger may induce noise on a certain number of the diamonds per column (e.g., 2, maybe more). If the Rx electrodes 430 are large, more noise will be coupled from the finger to a measurement system associated with the capacitance sense array panel 400. This coupled noise may impact the ability to properly sense finger location.

Figure 5:
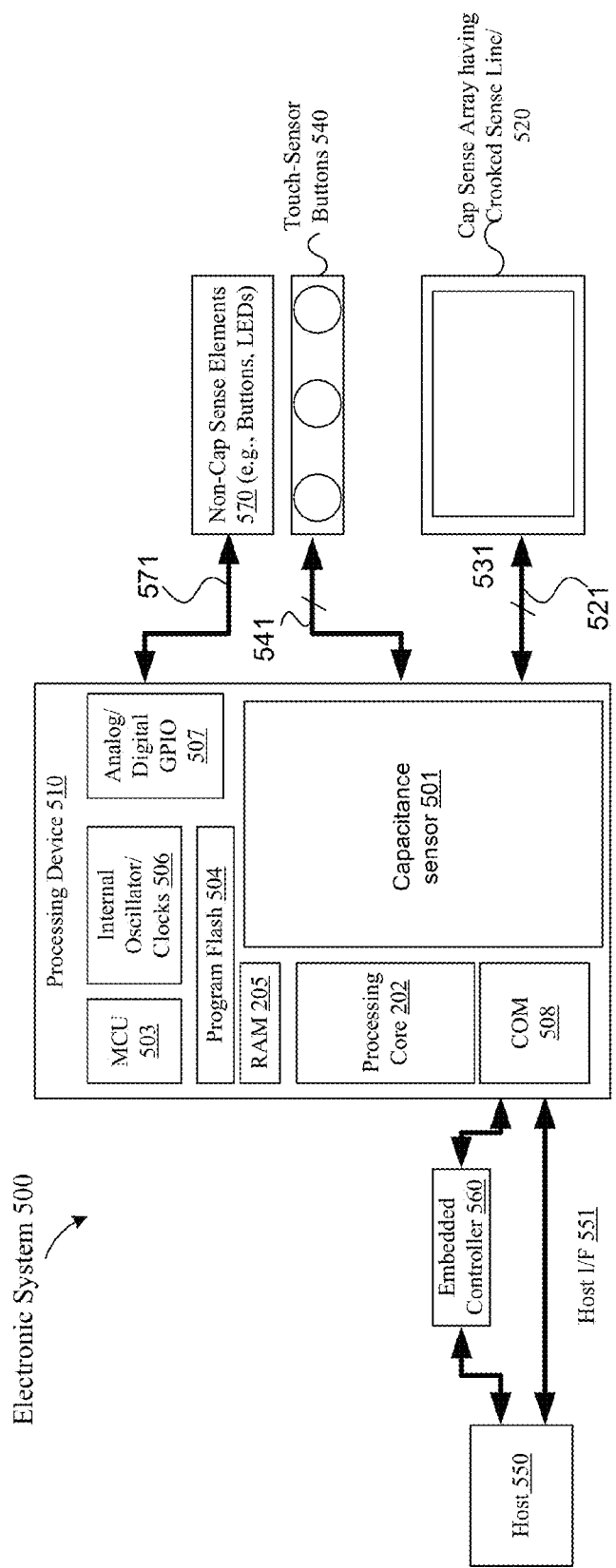
FIG. 5 is a block diagram illustrating one embodiment of an electronic system having a processing device for detecting a presence of a conductive object on a capacitive sense array having sense elements disposed in crooked paths.

FIG. 5 is a block diagram illustrating one embodiment of an electronic system 500 having a processing device for detecting a presence of a conductive object on a capacitive sense array 520 including sense elements disposed in crooked paths 520. Conventional capacitive sense arrays that have the sense elements disposed in the two axes in a mutually orthogonal pattern (e.g., straight lines of sense elements about an X-axis and straight lines of sense elements about a Y-axis that are perpendicular to the straight lines of sense elements about the X-axis). Unlike conventional capacitive sense arrays, the capacitive sense array 520 includes sense elements that are disposed in crooked paths about one of the axes. In other embodiments, the sense elements can be disposed in crooked paths in both X and Y axes or in multiple axes where there are more than two axes. The crooked paths may include patterns where some sense elements that would normally be in the same column are in different columns such that consecutive sense element (such as consecutive diamonds) are not in the same column, but are in a neighboring column or more than one column away. In other embodiments, one of the sets of sensor elements, such as the sense elements of the X-axis are disposed at an oblique angle relative to other Y-axis, or vice versa. Alternatively, other patterns may be used for the crooked paths as would be appreciated by one of ordinary skill in the art having the benefit of this disclosure.

Electronic system 500 includes processing device 510, capacitive sense array having sense elements disposed in crooked paths 520, touch-sense buttons 540, host processor 550, embedded controller 560, and non-capacitance sense elements 570. The processing device 510 may include analog and/or digital general purpose input/output ("GPIO") ports 507. GPIO ports 507 may be programmable. GPIO ports 507 may be coupled to a Programmable Interconnect and Logic ("PIL"), which acts as an interconnect between GPIO ports 507 and a digital block array of the processing device 510 (not shown). The digital block array may be configured to implement a variety of digital logic circuits (e.g., digital filters, timers, counters, or digital control systems) using, in one embodiment, configurable user modules ("UMs"). The digital block array may be coupled to a system bus. Processing device 510 may also include memory, such as random access memory ("RAM") 505 and program flash 504. RAM 505 may be static RAM ("SRAM"), and program flash 504 may be a non-volatile storage, which may be used to store firmware (e.g., control algorithms executable by processing core 502 to implement operations described herein). Processing device 510 may also include a microcontroller unit ("MCU") 503 coupled to memory and the processing core 502.

The processing device 510 may also include an analog block array (not shown). The analog block array is also coupled to the system bus. Analog block array also may be configured to implement a variety of analog circuits (e.g., ADCs, DACs, or analog filters) using, in one embodiment, configurable UMs. The analog block array may also be coupled to the GPIO ports 507.

As illustrated, capacitance sensor 501 may be integrated into processing device 510. Capacitance sensor 501 may include analog I/O for coupling to an external component, such as capacitive sense array having sense elements disposed in crooked paths 520, touch-sense buttons 540, and/or other devices. Capacitance sensor 501 and processing device 510 are described in more detail below.

The embodiments described herein can be used in any capacitive sense array application, for example, the capacitive sense array having sense elements disposed in crooked paths 520 may be a touch screen, a touch-sense slider, or touch-sense buttons 540 (e.g., capacitance sense buttons). In one embodiment, these sense devices may include one or more capacitive sense elements. The operations described herein may include, but are not limited to, notebook pointer operations, lighting control (dimmer), volume control, graphic equalizer control, speed control, or other control operations requiring gradual or discrete adjustments. It should also be noted that these embodiments of capacitive sense implementations may be used in conjunction with non-capacitive sense elements 570, including but not limited to pick buttons, sliders (ex. display brightness and contrast), scroll-wheels, multi-media control (ex. volume, track advance, etc) handwriting recognition and numeric keypad operation.

In one embodiment, the electronic system 500 includes a capacitive sense array of sense elements disposed in crooked paths 520 coupled to the processing device 510 via bus 521. The capacitive sense array having sense elements disposed in crooked paths 520 may include a one-dimensional sense array in one embodiment and a two dimensional sense array in another embodiment. Alternatively, the capacitive sense array having sense elements disposed in crooked paths 520 may have more dimensions. Also, in one embodiment, the capacitive sense array having sense elements disposed in crooked paths 520 may be sliders, touchpads, touch screens or other sensing devices. In another embodiment, the electronic system 500 includes touch-sense buttons 540 coupled to the processing device 510 via bus 541. Touch-sense buttons 540 may include a single-dimension or multi-dimension sense array. The single- or multi-dimension sense array may include multiple sense elements. For a touch-sense button, the sense elements may be coupled together to detect a presence of a conductive object over the entire surface of the sense device. Alternatively, the touch-sense buttons 540 may have a single sense element to detect the presence of the conductive object. In one embodiment, touch-sense buttons 540 may include a capacitive sense element. Capacitive sense elements may be used as non-contact sense elements. These sense elements, when protected by an insulating layer, offer resistance to severe environments.

The electronic system 500 may include any combination of one or more of the capacitive sense array having sense elements disposed in crooked paths 520, and/or touch-sense button 540. In another embodiment, the electronic system 500 may also include non-capacitance sense elements 570 coupled to the processing device 510 via bus 571. The non-capacitance sense elements 470 may include buttons, light emitting diodes ("LEDs"), and other user interface devices, such as a mouse, a keyboard, or other functional keys that do not require capacitance sensing. In one embodiment, busses 571, 541, 531, and 521 may be a single bus. Alternatively, these buses may be configured into any combination of one or more separate buses.

Processing device 510 may include internal oscillator/clocks 506 and communication block ("COM") 508. The oscillator/clocks block 506 provides clock signals to one or more of the components of processing device 510. Communication block 508 may be used to communicate with an external component, such as a host processor 550, via host interface ("I/F") line 551. Alternatively, processing device 510 may also be coupled to the embedded controller 260 to communicate with the external components, such as host processor 550. In one embodiment, the processing device 510 is configured to communicate with the embedded controller 560 or the host processor 550 to send and/or receive data.

Processing device 510 may reside on a common carrier substrate such as, for example, an integrated circuit ("IC") die substrate, a multi-chip module substrate, or the like. Alternatively, the components of processing device 510 may be one or more separate integrated circuits and/or discrete components. In one exemplary embodiment, processing device 510 may be the Programmable System on a Chip ("PSoC®") processing device, developed by Cypress Semiconductor Corporation, San Jose, Calif. Alternatively, processing device 510 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sense device and sends the raw data to a host computer where it is analyzed by an application. In effect the processing that is done by processing device 510 may also be done in the host.

It is noted that the processing device 510 of FIG. 5 may measure capacitance using various techniques, such as self-capacitance sensing and mutual capacitance sensing. The self-capacitance sensing mode is also called single-electrode sensing mode, as each sensor element needs only one connection wire to the sensing circuit. For the self-capacitance sensing mode, a conductive object proximate with the sense electrode increases the capacitance of the sense electrode to ground. Mutual capacitance change is detected in the mutual capacitance-sensing mode. Each intersection uses at least two electrodes to create a fringing electric field: one is a transmitter (Tx) electrode and the other is a receiver (Rx) electrode. When a ground-coupled conductive object is proximate with an intersection, the capacitive coupling of the Rx and the Tx of the intersection is decreased as the conductive object shunts part of the electric field to ground (e.g., chassis or earth).

Capacitance sensor 501 may be integrated into the IC of the processing device 510, or alternatively, in a separate IC. The capacitance sensor 501 may include relaxation oscillator (RO) circuitry, a sigma delta modulator (also referred to as CSD) circuitry, charge transfer circuitry, charge accumulation circuitry, or the like, for measuring capacitance as would be appreciated by one of ordinary skill in the art having the benefit of this disclosure. Alternatively, descriptions of capacitance sensor 501 may be generated and compiled for incorporation into other integrated circuits. For example, behavioral level code describing capacitance sensor 501, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 501.

It should be noted that the components of electronic system 500 may include all the components described above. Alternatively, electronic system 500 may include only some of the components described above.

In one embodiment, electronic system 500 is used in a notebook computer. Alternatively, the electronic device may be used in other applications, such as a mobile handset, a personal data assistant ("PDA"), a keyboard, a television, a remote control, a monitor, a handheld multi-media device, a handheld video player, a handheld gaming device, or a control panel.

Figure 6A:
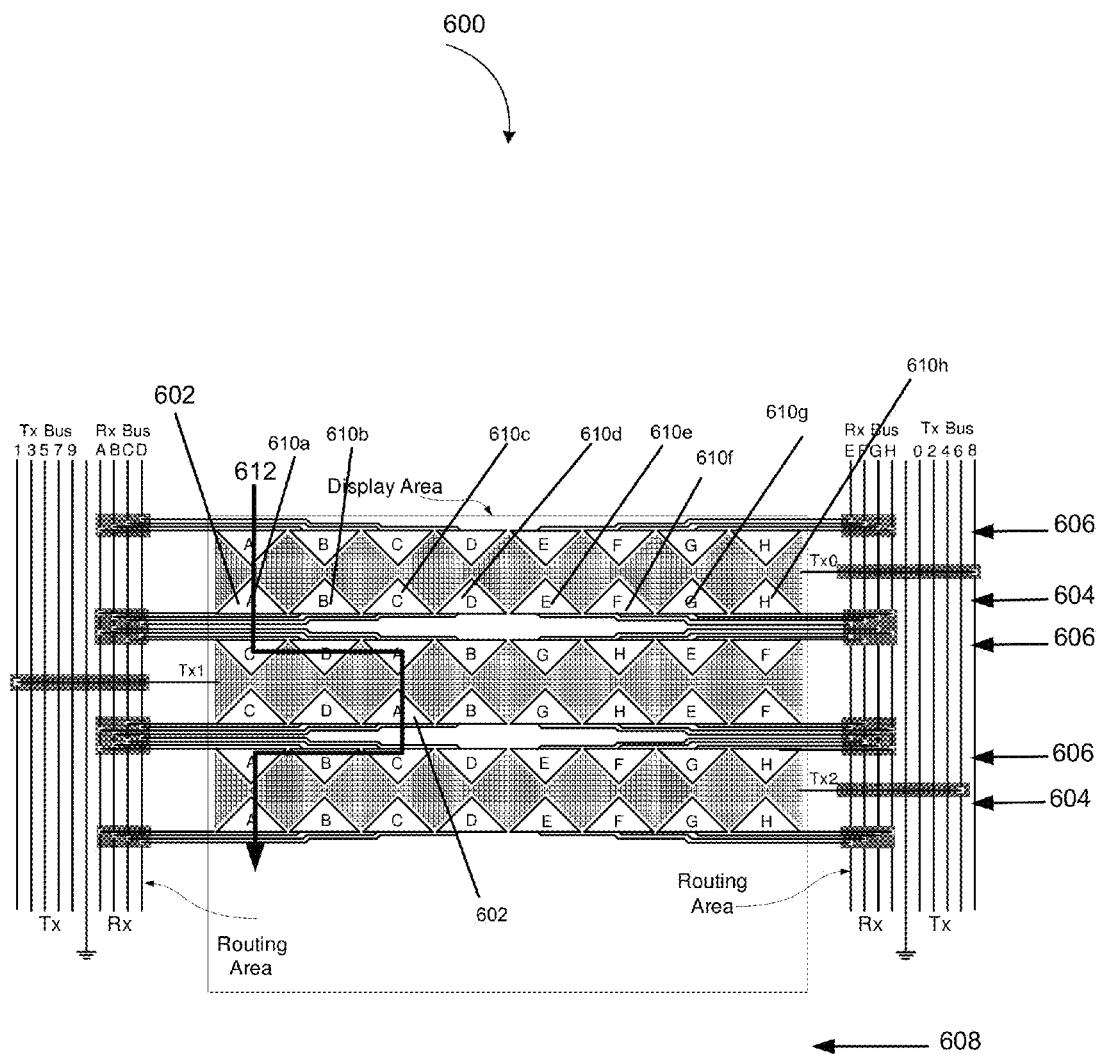
FIG. 6A illustrates a plan view of one embodiment of capacitive sense array having sense elements formed of half-diamond shapes disposed in crooked paths.
Figure 6B:
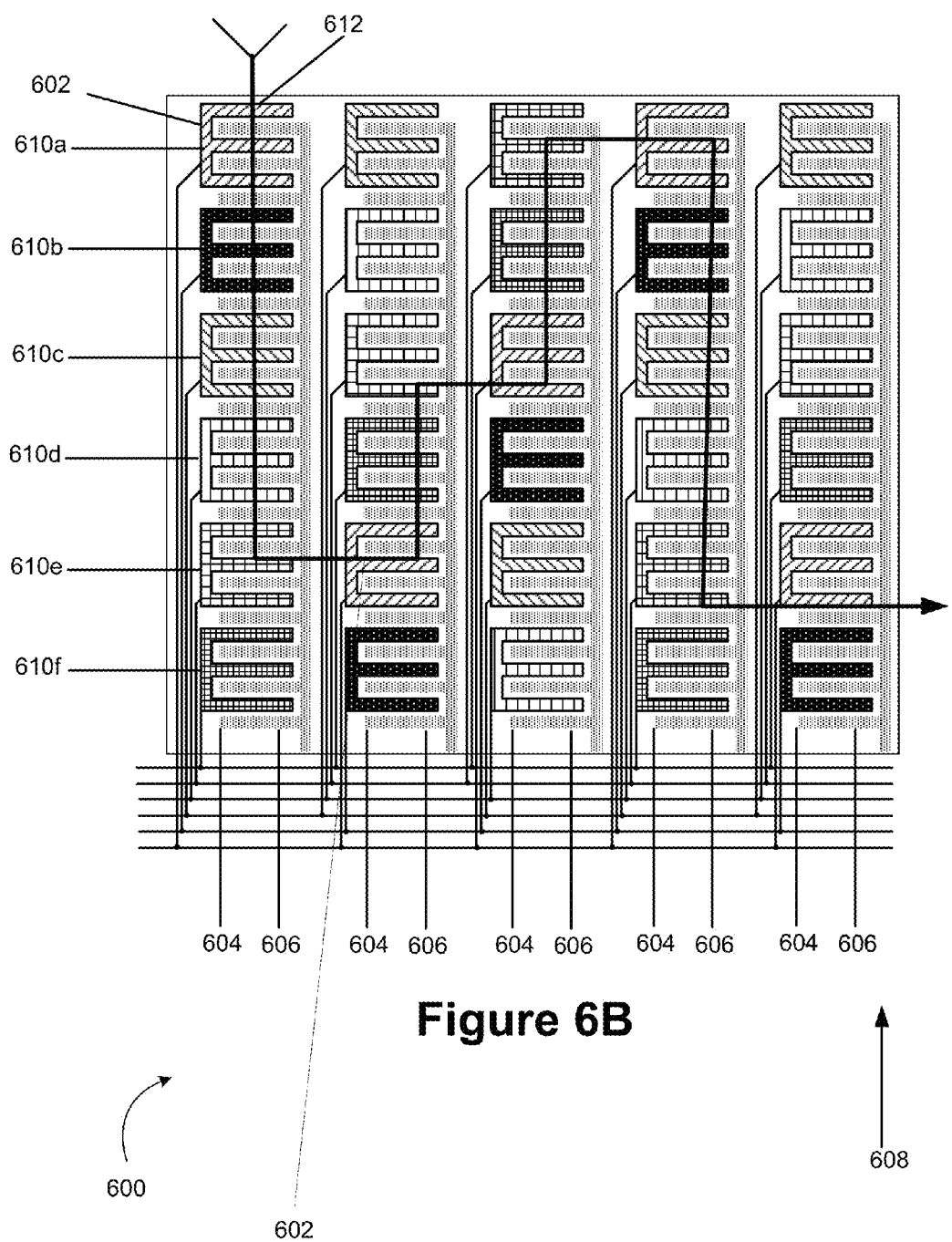
FIG. 6B illustrates a plan view of one embodiment of capacitive sense array having sense elements formed of interdigitated comb shapes disposed in crooked paths.

FIG. 6A illustrates a plan view of one embodiment of capacitive sense array 600 having sense elements 602 formed of half-diamond shapes disposed in crooked paths. FIG. 6B illustrates a plan view of one embodiment of capacitive sense array having sense elements 602 formed of interdigitated comb shapes disposed in crooked paths.

Referring now to FIGS. 6A and 6B, the capacitive sense array 600 includes several Tx electrodes 604 disposed in straight parallel lines 606 along a first axis 608 of the capacitive sense array 600. The capacitive sense array 600 also includes several sets of Rx sense elements 610a-610h disposed in crooked paths along a second axis 612 of the capacitive sense array 600. Again, although Tx sense elements and Rx sense elements are used, the sense elements may be the sense elements used in self capacitance sensing as would be appreciated by one of ordinary skill in the art having the benefit of this disclosure.

In an embodiment depicted in FIG. 6A, each of the crooked columns may include a group of segmented half-diamond shaped elements. The group of segmented half-diamond shaped elements may be connected to a respective sensing channel coupled to the processing device 510. Sense elements in the group are disposed in different columns of the capacitive sense array 600 to form the crooked columns. Thus, the Rx sense elements form crooked paths in which the Rx sense elements that are connected to a conductive trace (which is coupled to one of the pins Rx0-Rx7) are aligned in different columns. In one embodiment, the crooked paths may repeat and the crooked path may have some of the sense elements in the same column, but not as consecutive sense elements in the column.

FIG. 6A illustrates one example of the crooked paths, but other crooked paths for the sense elements of the columns may be used as would be appreciated by one of ordinary skill in the art having the benefit of this disclosure (e.g., FIG. 6B).

Figure 7A:
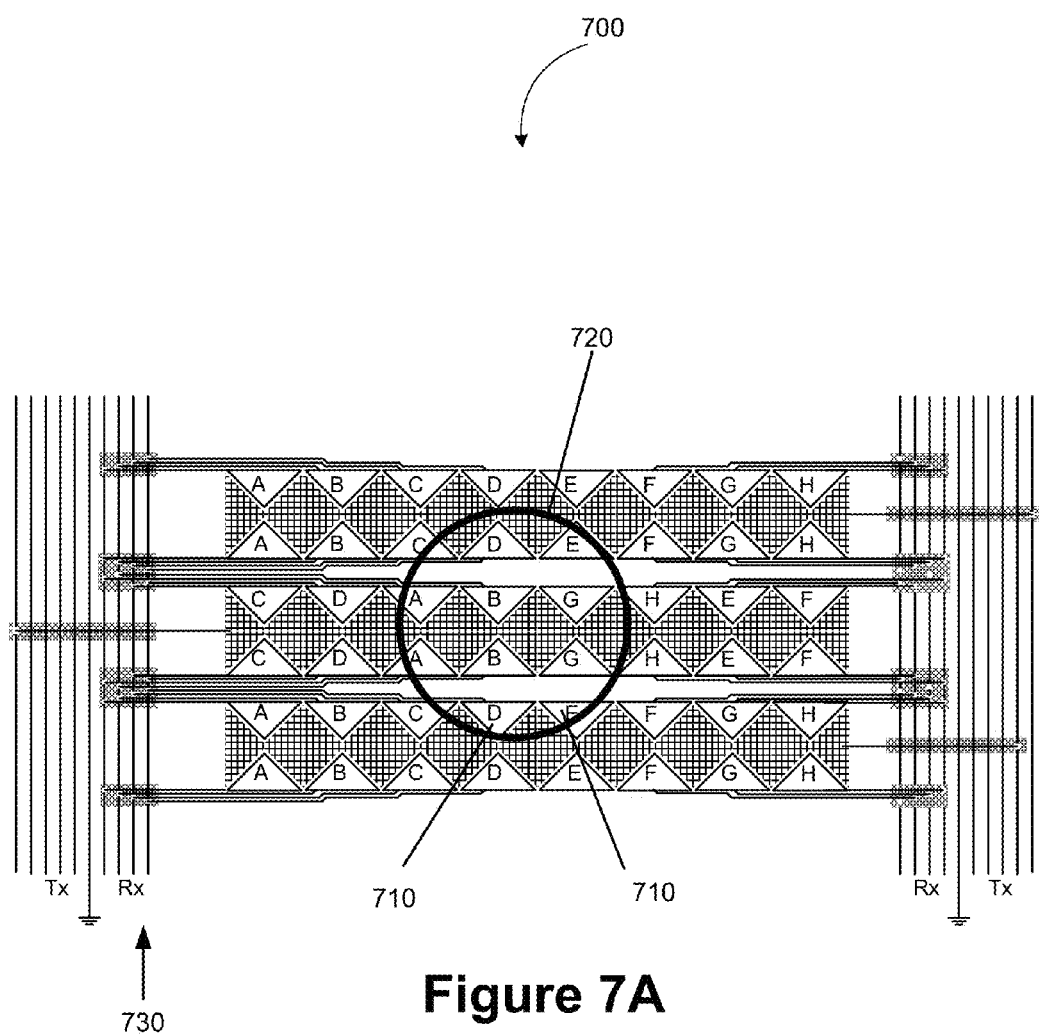
FIG. 7A shows an approximate finger area that may overlay a group of Rx sense elements associated with a set of Rx electrodes when a user touches a touch sense array for the embodiment of FIG. 6A.
Figure 7B:
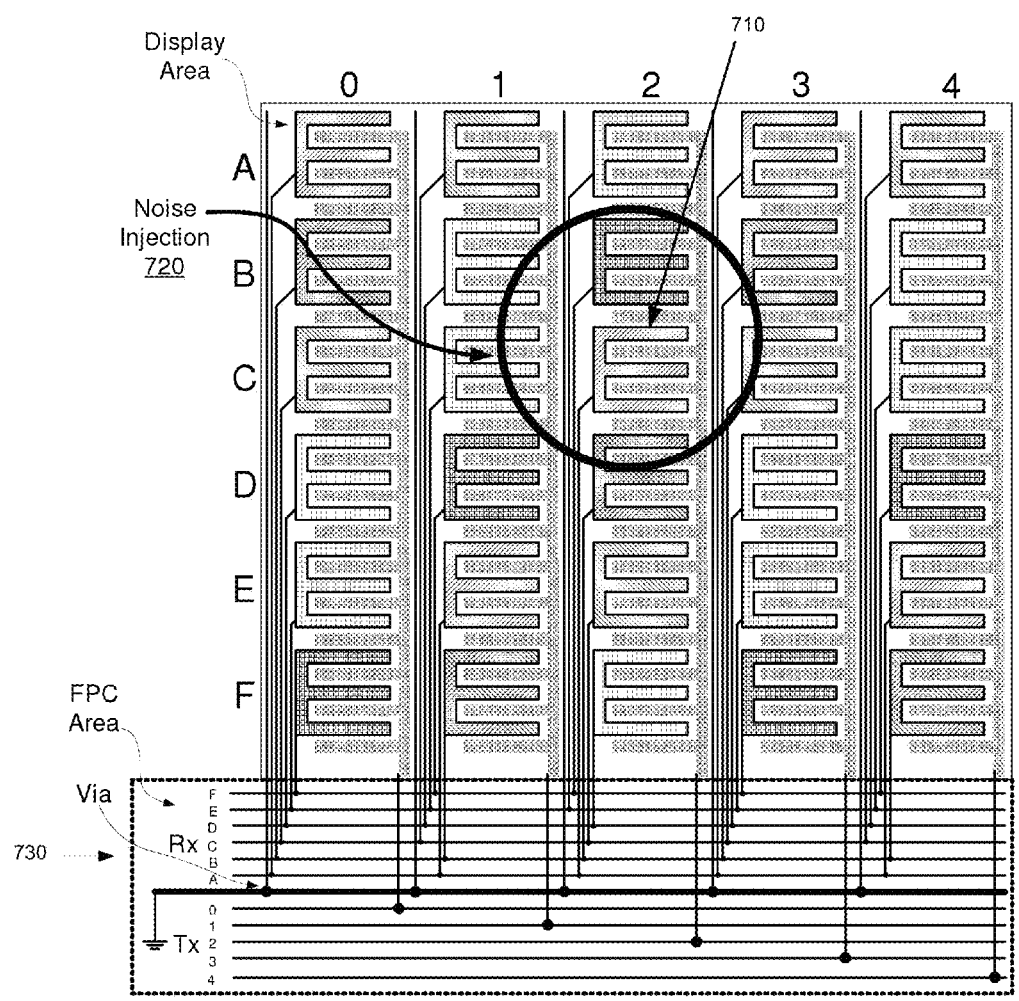
FIG. 7B shows an approximate finger area that may overlay a group of Rx sense elements associated with a set of Rx electrodes when a user touches a touch sense array for the embodiment of FIG. 6B.

By varying the connection scheme of straight Rx channels/conductive traces and Tx sense elements relative to Rx sense elements along crooked paths, the effects of noise coupling are reduced because the capacitive coupling from the noise source to an Rx channel on the touch sensor is reduced. As shown in FIGS. 7A and 7B, finger coupling to the Rx sense elements 710 is much less than that of the standard straight electrode pattern of FIG. 4. Notice that the finger area 720 in FIG. 7 is only coupled to one each of the Rx channels 730, and has about half as much coupling as the straight electrode pattern of FIG. 4. Similarly, the amount of charger noise coupled into each of the Rx channels 730 may be reduced by about half. This may be the result of noise that has 50% of its prior capacitive coupling. As a result, a density of the Tx sense elements 720 and the Rx sense elements 710 is about one sense element per finger touch area. Alternatively, other patterns may result in more than one sense element per finger touch area, but less than conventional patterns.

Figure 8:
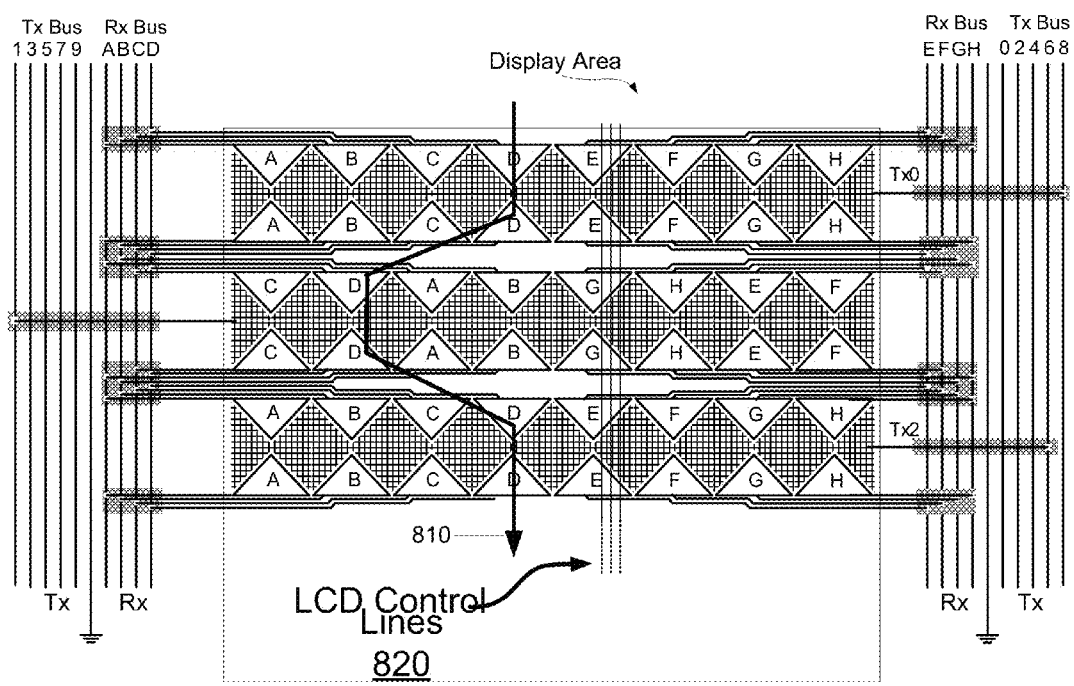
FIG. 8 is a plan view of the embodiment of FIG. 6A illustrating how LCD line switching noise is reduced by reducing coupling of a crooked Rx sense line with an LCD column line.

Referring to FIG. 8, the effects of LCD (or AMOLED) line switching noise are reduced by reducing coupling of a crooked Rx sense line 810 with an LCD column line 820. It should be noted that in FIG. 8, instead of coupling all of the noise amplitude of an LCD column 820 to one Rx sense line 810, the noise is reduced and shared among many Rx sense lines 810 because of the crooked paths of the Rx sense lines.

Referring again to FIG. 5, when the capacitive sense array having sense elements disposed in crooked paths 520 is coupled to the processing device 510, the processing device 510 may be configured to detect a conductive object proximate to the capacitive sense array 520. In one embodiment, the processing device 520 may be configured to use a first set of sense elements disposed along straight lines as Tx electrodes and a second set of sense elements disposed along crooked paths as Rx electrodes. It is noted that in the above embodiments, the orientation of axes associated with Tx electrodes and Rx electrodes may be switched as would be appreciated by one of ordinary skill in the art having the benefit of this disclosure. For example, in an embodiment, the processing device 520 may be configured to use a first set of sense elements disposed in an X-axis and a second set of sense elements disposed in a Y-axis, or vice versa. In another embodiment, the sense elements disposed along straight lines may be the Rx electrodes and a second set of sense elements disposed along crooked paths may be the Tx electrodes. In another embodiment, the processing device 520 may be configured to use a first set of sense elements disposed along crooked paths as Rx electrodes and a second set of sense elements disposed another set of crooked paths as Tx electrodes. However, the Rx electrodes are more susceptible to noise and those may benefit from being disposed in the crooked paths.

Figure 9:
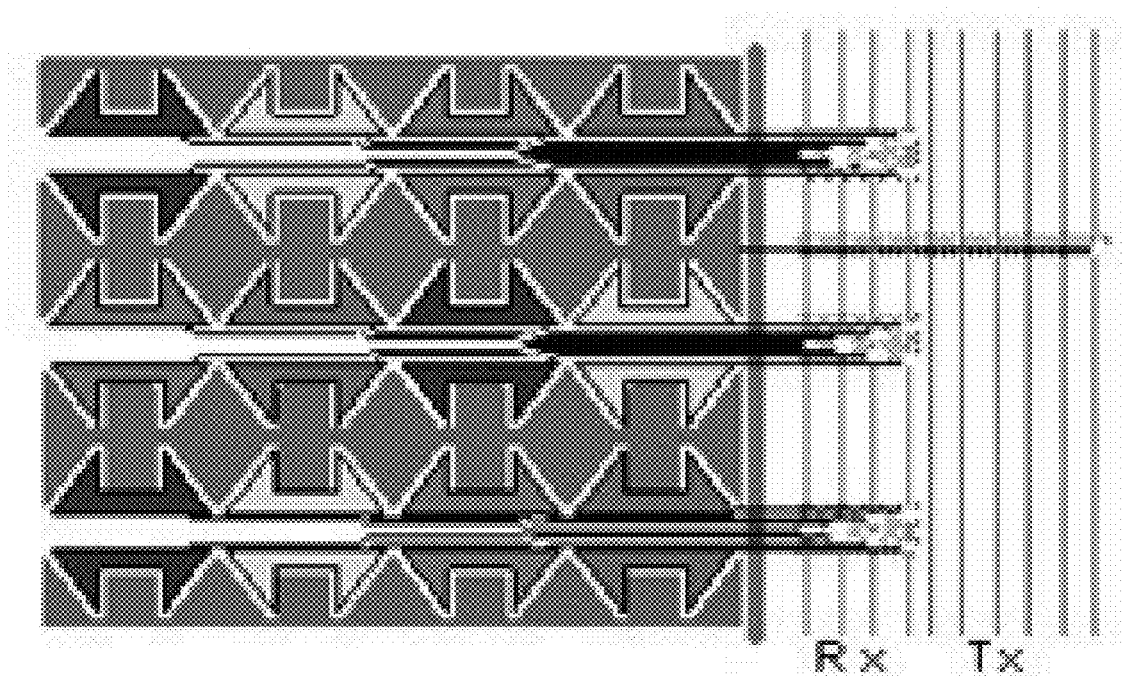
FIGS. 9 and 10 are plan views of the embodiments of FIGS. 6A-6C illustrating sense elements of other shapes and patterns.
Figure 10:
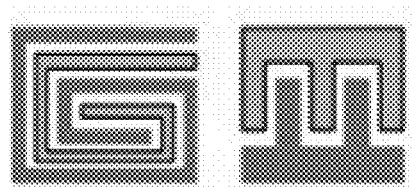

It is also noted that the sense elements as disclosed in the above embodiments may comprise diamond shapes, however, one skilled in the art would appreciate that the sense elements may comprise other shapes and patterns as shown in FIGS. 9 and 10. These include such shapes as single-solid diamond (SSD), a dual-solid diamond (DSD), a set of horizontal and vertical bars, a totem pole, a double arrow, squares, circles, pentagons, interdigitated combs, spirals, or other tessellated shapes and configurations as would be appreciated by one of ordinary skill in the art having the benefit of this disclosure.

FIGS. 11A-11E are plan views of embodiments of capacitive sense array having sense elements disposed in off-axis lines. A common characteristic of the embodiments illustrated in FIGS. 11A-11E is that sense elements or sensing channels for at least one of the axes are oriented at oblique angles to one another. For example, the lines associated with at least one of the Tx sense elements 1110, the Rx sense elements 1120, and sensing channels/conductive traces (not shown) to the sides of the touch sense array 1100 are oriented at oblique angles to one another.

Figure 11A:
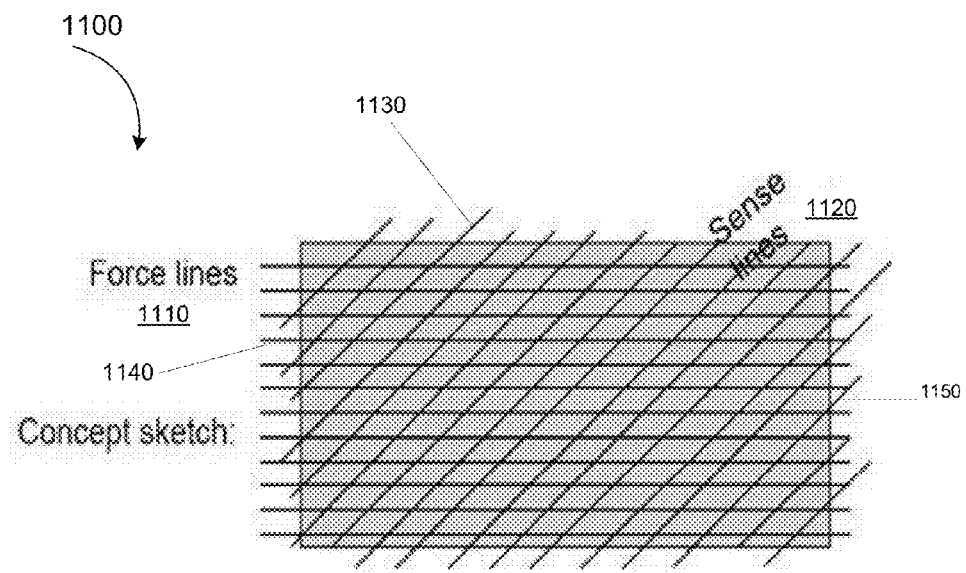
FIGS. 11A-11E are plan views of embodiments of capacitive sense array having sense elements disposed in off-axis lines.
Figure 11B:
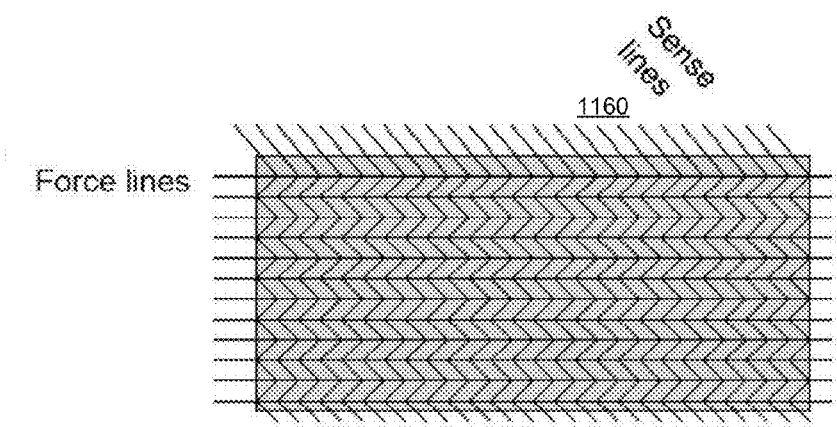
Figure 11C:
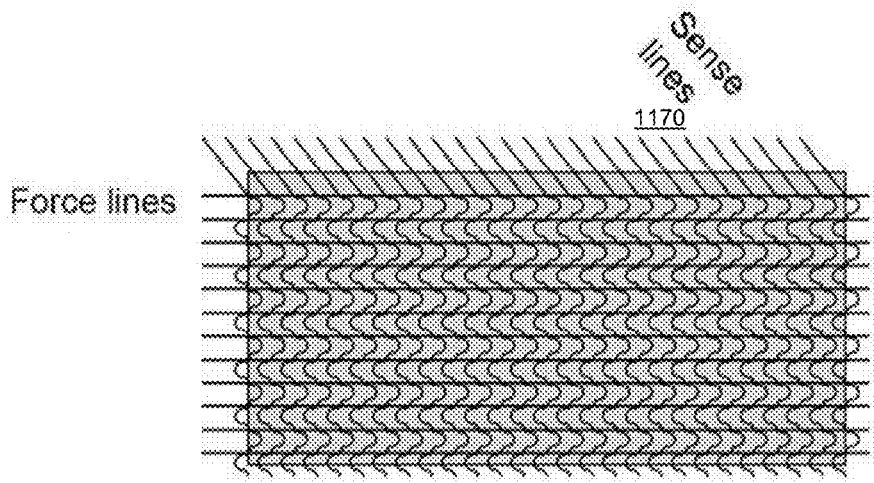
Figure 11D:
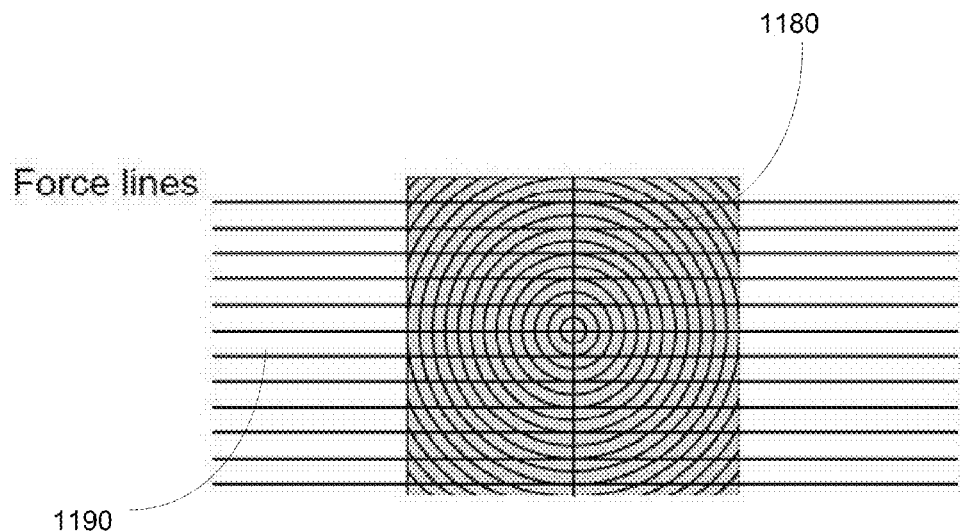
Figure 11E:
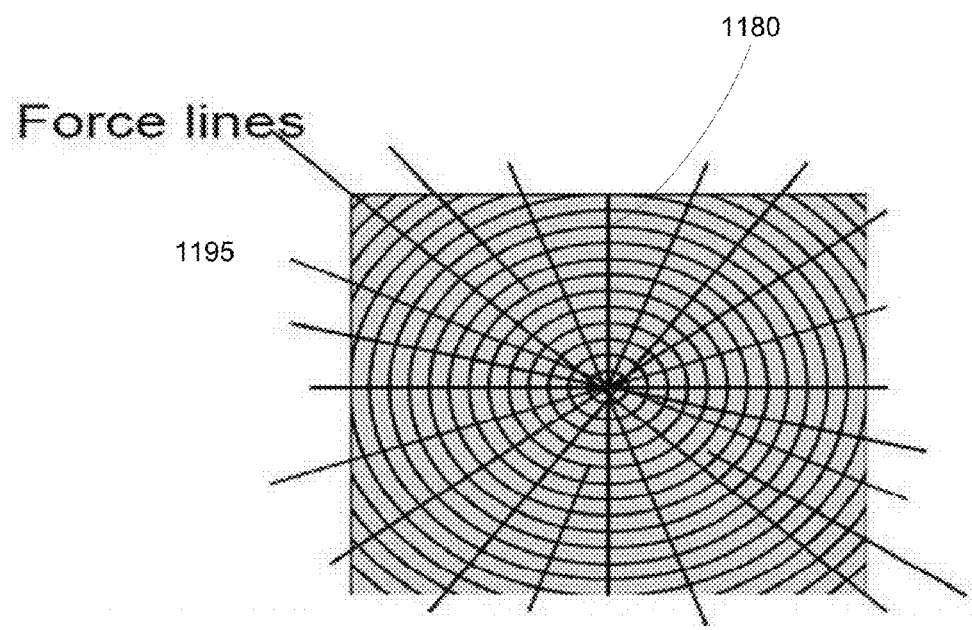

In the embodiment illustrated in FIG. 11A, the Rx sense elements 1120 are arranged in straight lines 1130 at an oblique angle (e.g., 30 degrees to 60 degrees) relative to straight lines 1140 along which the Tx sense elements 1110 are disposed. Consequently, the lines 1140 associated with the Rx sense elements 1120 are also oblique relative to the screen edges 1150 and hence to the conductive traces of the sensing channels and LCD traces (not shown). This reduces induced LCD line traces-to-sense element noise coupling. Other oblique-angled patterns include, but are not limited to: (1) a zig-zag pattern of Rx sense elements 1160 (see FIG. 11B); (2) a wavy pattern (see FIG. 11C) of Rx sense elements 1170 formed of semicircles, ovals, and other curves; and (3) various forms of patterns of Rx sense elements and/or Tx sense elements arranged along polar coordinates. FIG. 11D shows the Rx sense element 1180 arranged in a concentric circular pattern with Tx sense elements 1190 arranged in straight lines, while, in FIG. 11E, the Tx sense elements 1195 are arranged in a radial pattern along a third axis in addition to the Rx sense elements 1180 arranged in concentric circles about a polar coordinate axis distinct from rectangular coordinate axes. In one embodiment, connection to the sense elements 1180, 1190, 1195 may be oriented at oblique angles. In one embodiment, at least one of the Rx sense elements 1180 and the Tx sense elements 1190, 1195 may form crooked paths of sense elements in addition to off-axis orientations/patterns of sense lines.

Figure 12A:
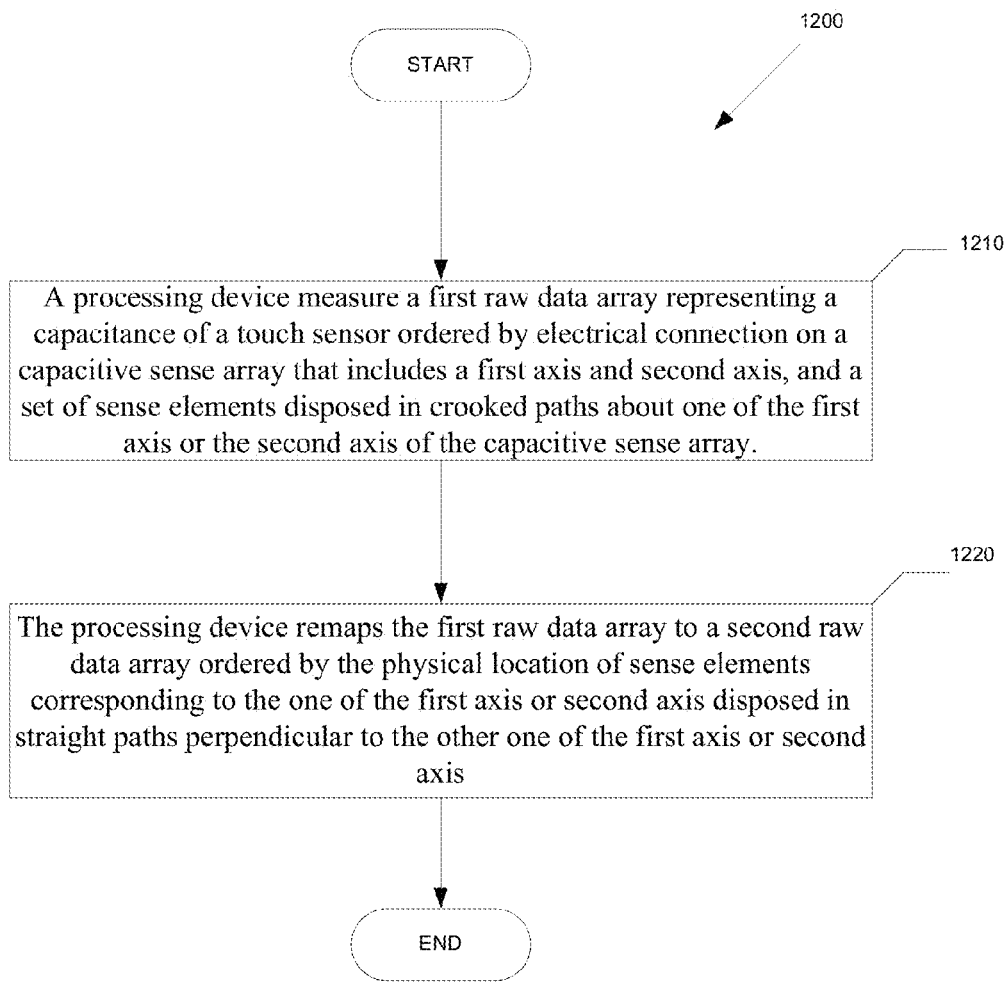
FIG. 12A is a process flow diagram of one embodiment of a method of remapping (to rectangular coordinates) difference counts measured by the controller of FIG. 5 received from a capacitive sense array that include at least one set of sense elements disposed in crooked paths.
Figure 12B:
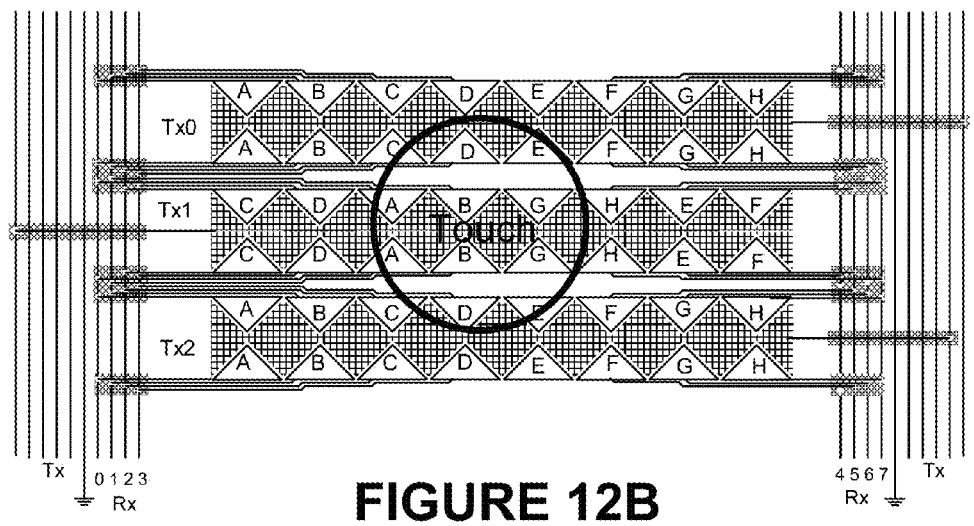
FIG. 12B is a plan view of a crooked Rx sensor with an overlapping touch.

FIG. 12A is a process flow diagram of one embodiment of a method of remapping difference counts measured by the controller 510 of FIG. 5 received from a capacitive sense array that include at least one set of sense elements disposed in crooked paths. The data measured by the controller 510 is stored in an array that associated by Rx channel, not the physical location of the column on the touchscreen and is therefore not presented to the touch processing algorithms in a form that directly represents the physical location of the touch on the sensor array. The process in 1200 is a method of remapping the data array such that the data is stored by physical location, rather than electrical connection. FIG. 12B is a plan view of a crooked Rx sensor with an overlapping touch used in an example of remapping as described in FIG. 12A above and 12C below. FIG. 12C shows an example of a table of difference counts measured by the controller of FIG. 5 and the remapped values corresponding to the physical location of a touch. As used herein, difference counts represent the difference in mutual capacitance for an intersection before and after a touch (diff=−1*(c_touch−c_notouch)). Another term for a notouch condition is baseline. The capacitance is converted to a digital value with a certain resolution (in units of fF/bit). Referring now to FIGS. 5, and 12A-12C, the data measured by the controller 510 is stored in an array that is associated by Rx channel, not the physical location of the column on a touchscreen and is therefore not presented to touch processing algorithms in a form that directly represents a physical location of a touch on the sensor array. The process flow 1200 is a method of remapping the data array such that the data is stored by physical location, rather than by electrical connection. In some embodiments, processing logic may be used to perform the method 1200. The processing logic may include hardware, software, or any combination thereof. In one embodiment, the processing device 510 performs the method 1200. Alternatively, other components of the electronic system 500 may be used to perform some or all of the operations of the method 1200.

In some embodiments, processing logic may be used to perform the method 1200. The processing logic may include hardware, software, or any combination thereof. In one embodiment, the controller 110, 210 performs the method 1200. Alternatively, other components may be used to perform some or all of the operations of the method 1200.

Referring again to FIG. 12A, at block 1210, a processing device measure a first raw data array representing a capacitance of a touch sensor ordered by electrical connection on a capacitive sense array that includes a first axis and second axis, and a set of sense elements disposed in crooked paths about one of the first axis or the second axis of the capacitive sense array. At block 1220, the processing device remaps the first raw data array to a second raw data array ordered by the physical location of sense elements corresponding to the one of the first axis or second axis disposed in straight paths perpendicular to the other one of the first axis or second axis (i.e., the conventional physical location of raw data on a touchscreen). In an embodiment, remapping the first raw data array to the second raw data array may include filtering a first set of elements of the first raw data array, and remapping each of the first set of elements of the first raw data array to corresponding second elements of the second raw data array. In an embodiment, remapping the first raw data array to the second raw data array may not be performed if values of each of the first set of elements are below a threshold.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A capacitive sense array, comprising:
a first set of sense elements disposed in straight parallel paths along a first axis of the capacitive sense array; and
a second set of sense elements disposed in crooked paths along a second axis of the capacitive sense array and arranged in columns along the second axis, the second set of sense elements comprising a plurality of subsets, wherein each subset of the plurality of subsets is disposed in a distinct one of the crooked paths, wherein each subset of the plurality of subsets is connected to a distinct one of a plurality of conductive traces of the capacitive sense array, wherein within each subset of the plurality of subsets, each sense element of the subset is connected to the same distinct one of the plurality of conductive traces, wherein for each subset of the plurality of subsets, a plurality of sense elements of the subset is aligned in different columns, and wherein a column of the columns includes sense elements from two or more subsets of the plurality of subsets;
wherein the capacitive sense array is coupled to a processing device configured to measure capacitances associated with the first set of sense elements and the second set of sense elements.

2. The capacitive sense array of claim 1, wherein the crooked paths are disposed in straight lines at an oblique angle relative to the straight parallel paths along the first axis.

3. The capacitive sense array of claim 1, wherein the first set of sense elements are straight rows of the capacitive sense array and the second set of sense elements are crooked columns of the capacitive sense array.

4. The capacitive sense array of claim 1, wherein the first set of sense elements are transmit electrodes of the capacitive sense array and the second set of sense elements are receive electrodes of the capacitive sense array.

5. The capacitive sense array of claim 1, wherein the crooked paths are disposed to not be parallel to LCD or AMOLED control signal carrying lines that are disposed in straight parallel lines along the second axis.

6. The capacitive sense array of claim 1, wherein the crooked paths form a repeating wavy pattern.

7. The capacitive sense array of claim 6, wherein the crooked paths form a repeating semicircular wavy pattern.

8. The capacitive sense array of claim 1, wherein the crooked paths form a concentric radial pattern.

9. The capacitive sense array of claim 1, wherein each of the second set of sense elements has a shape of at least one of a single-solid diamond (SSD), a dual-solid diamond (DSD), a set of horizontal and vertical bars, a totem pole, an interdigitated comb, a spiral, or a double arrow.

10. The capacitive sense array of claim 1, wherein the crooked paths may repeat and the crooked paths may have some of the second set of sense elements in the same column, but not as consecutive sense elements in the same column.

11. The capacitive sense array of claim 1, wherein a density of the first set of sense elements and the second set of sense elements is about one sense element per finger touch area.

12. The capacitive sense array of claim 1, coupled to the processing device, wherein the processing device is configured to detect a conductive object proximate to the capacitive sense array, the processing device is configured to use the first set of sense elements as one of Tx electrodes and Rx electrodes and the second set of sense elements as the other one of the Tx electrodes and the Rx electrodes.

13. An electronic system comprising:
a processing device; and
a capacitive sense array including a first axis and a second axis, wherein the capacitive sense array comprises a first set of sense elements disposed in crooked paths along one of the first axis and second axis, wherein the processing device is configured to detect a conductive object proximate to the capacitive sense array, wherein the first set of sense elements comprises a plurality of subsets, each of which is disposed in a distinct one of the crooked paths, wherein each subset of the plurality of subsets is connected to a distinct one of a plurality of conductive traces of the capacitive sense array, wherein a plurality of sense elements of each of the subsets of the first set of sense elements are aligned in different columns, wherein alignment of the columns is in relation to the other one of the first axis and the second axis, wherein the first set of sense elements are crooked columns of the capacitive sense array, wherein each of the crooked columns comprises a respective subset of the plurality of subsets, each respective subset of the plurality of subsets being connected to a respective sensing channel coupled to the processing device, and wherein consecutive sense elements within a respective subset of the plurality of subsets are disposed in different columns of the capacitive sense array to form the crooked columns.

14. The electronic system of claim 13, wherein the capacitive sense array comprises a second set of sense elements disposed in straight parallel lines along the other one of the first axis or second axis.

15. The electronic system of claim 14, wherein the second set of sense elements are straight rows of the capacitive sense array.

16. The electronic system of claim 15, wherein each of the subsets comprises a group of segmented diamond shaped elements.

17. The electronic system of claim 15, wherein the crooked paths are disposed in straight lines at an oblique angle relative to the straight parallel lines along the other one of the first axis or second axis.

* * * * *